US012060059B2

(12) United States Patent
Weiss et al.

(10) Patent No.: US 12,060,059 B2
(45) Date of Patent: *Aug. 13, 2024

(54) METHOD AND APPARATUS FOR CONTROLLING A SAFETY DEVICE OF A VEHICLE, AND SAFETY SYSTEM FOR A VEHICLE

(71) Applicant: Robert Bosch GmbH, Stuttgart (DE)

(72) Inventors: Christian Weiss, Leonberg (DE); Gyorgy Csaba, Budapest (HU); Heiko Kirn, Bietigheim-Bissingen (DE); Nina Braunert, Leonberg-Warmbronn (DE)

(73) Assignee: ROBERT BOSCH GMBH, Stuttgart (DE)

( * ) Notice: Subject to any disclaimer, the term of this patent is extended or adjusted under 35 U.S.C. 154(b) by 353 days.

This patent is subject to a terminal disclaimer.

(21) Appl. No.: 17/453,443

(22) Filed: Nov. 3, 2021

(65) Prior Publication Data
US 2022/0144263 A1 May 12, 2022

(30) Foreign Application Priority Data
Nov. 9, 2020 (DE) .................. 10 2020 214 032.4

(51) Int. Cl.
*B60W 30/08* (2012.01)
*B60W 30/095* (2012.01)

(52) U.S. Cl.
CPC ........ *B60W 30/0956* (2013.01); *B60W 30/08* (2013.01); *B60W 2520/10* (2013.01);
(Continued)

(58) Field of Classification Search
CPC . G08G 1/16; B60R 21/0134; B60W 2520/10; B60W 2520/12;
(Continued)

(56) References Cited

U.S. PATENT DOCUMENTS 8,321,066 B2* 11/2012 Becker .................. G01S 17/931
701/1
8,676,487 B2* 3/2014 Sakai .................... B60W 40/02
701/300
(Continued)

FOREIGN PATENT DOCUMENTS

CN 101622160 A * 1/2010 ......... B60R 21/0134
DE 102011115875 A1 * 4/2013 ......... B60R 21/0132
(Continued)

OTHER PUBLICATIONS

Heck et al., an English-translated version of DE 102011115875 A1 (Year: 2013).*

(Continued)

*Primary Examiner* — Cuong H Nguyen
(74) *Attorney, Agent, or Firm* — NORTON ROSE FULBRIGHT US LLP; Gerard A. Messina

(57) ABSTRACT

A method for controlling a safety device of a vehicle. The safety device reacts to an imminent collision of the vehicle with a collision object by an intervention in a longitudinal and/or lateral guidance of the vehicle. The method includes reading in environment data and trip data regarding the collision object and the vehicle, and intervention data regarding the intervention of the safety device; ascertaining a first expected impingement point of the collision object on the vehicle using the environment data and the trip data, and a second expected impingement point of the collision object on the vehicle using the environment data, the trip data, and the intervention data; executing an evaluation of a location of the first expected impingement point and of a location of the second expected impingement point relative to subregions referred to the vehicle, using reference data; and generating a control signal for the safety device.

9 Claims, 4 Drawing Sheets

(52) U.S. Cl.
CPC ... *B60W 2520/105* (2013.01); *B60W 2520/12* (2013.01); *B60W 2520/125* (2013.01); *B60W 2554/4041* (2020.02); *B60W 2554/4042* (2020.02); *B60W 2554/4043* (2020.02)

(58) Field of Classification Search
CPC ..... B60W 2520/105; B60W 2520/125; B60W 30/08; B60W 30/0953; B60W 30/0956; B60W 2554/4041; B60W 2554/4043; B60W 2554/4042; B60W 30/095
USPC ...... 701/45–46; 180/271, 274–275, 280, 282
See application file for complete search history.

(56) References Cited

U.S. PATENT DOCUMENTS

| | | | | |
|---|---|---|---|---|
| 9,802,566 | B2* | 10/2017 | Engelman | B60R 21/23 |
| 11,782,437 | B2* | 10/2023 | Letwin | G05D 1/86 |
| | | | | 701/23 |
| 2009/0299547 | A1* | 12/2009 | Becker | G01S 17/931 |
| | | | | 701/1 |
| 2011/0313664 | A1* | 12/2011 | Sakai | B60W 40/02 |
| | | | | 701/301 |
| 2018/0321677 | A1* | 11/2018 | Letwin | G05D 1/0088 |

FOREIGN PATENT DOCUMENTS

| | | | |
|---|---|---|---|
| DE | 102011115875 | A1 | 4/2013 |
| DE | 102012021004 | A1 | 4/2014 |
| DE | 102016201522 | A1 | 8/2017 |

OTHER PUBLICATIONS

Kim, Junghyun, et al. An abract of "Numerical Study on Wall Impingement and Film Formation in Direct-Injection Spark-Ignition Condition". No. 2020-01-1160. SAE Technical Paper, (Year: 2020).*

Pereira, Aaron, and Matthias Althoff. "Overapproximative human arm occupancy prediction for collision avoidance." IEEE Transactions on Automation Science and Engineering 15.2 818-831 (Year: 2017).*

Ade, Michael. An abstract of "Development of a Numerical Methodology for Water Management Simulations of Passenger Cars." (Year: 2019).*

* cited by examiner

METHOD AND APPARATUS FOR CONTROLLING A SAFETY DEVICE OF A VEHICLE, AND SAFETY SYSTEM FOR A VEHICLE

CROSS REFERENCE

The present application claims the benefit under 35 U.S.C. § 119 of German Patent Application No. DE 102020214032.4 filed on Nov. 9, 2020, which is expressly incorporated herein by reference in its entirety.

FIELD

The present invention relates to an apparatus or a method for controlling a safety device of a vehicle. A further subject of the present invention is a computer program.

BACKGROUND INFORMATION

Driver assistance systems that can perform automatic emergency braking of a vehicle as an intervention in the case of an acute risk of collision with one or several other traffic participants are, for example, conventional. In such an intervention a displacement of an impingement point, to be expected without the intervention, of another traffic participant on the vehicle into an undesired region of the vehicle can occur in some circumstances.

SUMMARY

The present invention provided a method, also an apparatus that uses that method, and a corresponding computer program, for controlling a safety device of a vehicle. The features disclosed herein make possible advantageous refinements of and improvements to the apparatus described herein.

In accordance with example embodiments of the present invention, in particular in the context of an imminent collision of a vehicle with a collision object, an impingement point and a possible displacement of the impingement point with consideration of an intervention of a safety device or of an assistance function of the vehicle can be repeatedly or continuously determined, and can be used to control the safety device. For example, the impingement point and possible displacement of the impingement point can be repeatedly or continuously predicted for consideration in the context of activation of an autonomous emergency braking (AEB) system for side impact scenarios or the like. In other words, a collision point of a collision object on the host vehicle can, in particular, be repeatedly or continuously determined or predicted as a basis for an activation decision of a safety device, in particular an autonomous safety device. For this, for example, a detection of the expected collision point can be repeatedly or continuously carried out and an ascertainment can be made as to whether and how that collision point will be displaced to a favorable or unfavorable position by a planned intervention of the safety device, in particular by adapting a velocity or trajectory of the host vehicle in the event of an autonomous braking or acceleration operation, or in the case of an autonomous evasive maneuver. In accordance with exemplifying embodiments, in particular the impingement point can be continuously ascertained and the system reactions can be continuously adapted to a possibly new situation. The result is to position the impingement point in a location that minimizes collision severity.

Advantageously, in accordance with embodiments of the present invention, in particular an improvement in the location of the collision point for side collisions in cross traffic scenarios can be achieved by a reaction to target vehicle actions. One advantage can be, for example, that it is possible to react to situational changes, for instance to a behavior of the collision object or collision opponent, in order to adapt the behavior of the host vehicle in suitable fashion. The adaptation of the behavior of the host vehicle can occur once, several times, or continuously up until the collision. If necessary or desired, the behavior of the host vehicle can be controlled in such a way that a specified, desired, and advantageous impingement point is achieved. Depending on a nature of the intervention or activated reaction pattern, for example a length and an intensity of an autonomous braking intervention or evasive maneuver, the collision can be avoided or the impingement point can be displaced along a contour of the host vehicle, for example, in the case of a reduction in the velocity of the host vehicle because of a time gain that results in a later arrival in a collision zone. In particular, an accident attenuation can be achieved by a reduction in the velocity of the host vehicle, in which context a collision point can be displaced, by the intervention of the safety device, for example, from a rear side region to a front side region or to a central front region of the host vehicle. In accordance with embodiments, a worsening of an accident sequence due to an intervention by the safety device can, in particular, also be avoided, by the fact that in the context of an expected displacement of the collision point into the region of the passenger compartment of the host vehicle, the planned intervention can be prevented even if a reduction in the velocity of the host vehicle thereby fails to occur. For example, in particular, a direct impact onto the passenger compartment of the vehicle, with possibly more-serious injuries to the occupants, can be reliably prevented. In particular, an advantageous modification of the collision region on the vehicle, and if applicable of the entire collision event, can be made possible by displacing the impingement point by suitable application of control to the safety device.

A method for controlling a safety device of a vehicle is provided in accordance with the present invention, the safety device being embodied to react to an imminent collision of the vehicle with a collision object by way of an intervention in a longitudinal and/or lateral guidance of the vehicle. In accordance with an example embodiment of the present invention, the method includes the following steps:

reading in, from an interface to at least one environment sensor of the vehicle, environment data regarding a position, a velocity and, additionally or alternatively, an acceleration of the collision object in an environment of the vehicle; from an interface to at least one trip data sensor of the vehicle, trip data regarding a position, a velocity and, additionally or alternatively, an acceleration of the vehicle; and from an interface to the safety device, intervention data regarding the intervention of the safety device;

ascertaining a first expected impingement point of the collision object on the vehicle using the environment data and the trip data, and a second expected impingement point of the collision object on the vehicle using the environment data, the trip data, and the intervention data;

executing an evaluation of a location of the first expected impingement point and of a location of the second expected impingement point relative to subregions referred to the vehicle, using reference data that define, for each subregion, an evaluation factor that depends on an effect of the location of an expected impingement point in the subregion on a safety status of at least one occupant of the vehicle; and generating, depending on a result of the evaluation, a control signal for output to an interface to the safety device, the control signal having at least one control parameter for controlling the safety device, the reading-in step, the ascertaining step, the executing step, and the generating step being performed, before a point in time at which the imminent collision occurs, at least once or continuously cyclically repeatedly, such that in the context of repeated performance, in the executing step the evaluation is executed depending on a detected change in the position, the velocity, and/or the acceleration of the collision object.

This method can be implemented, for example, in software or hardware or in a mixed form of software and hardware, for example in a control device or an apparatus. The vehicle can be a motor vehicle, in particular a passenger car or the like. The safety device can be embodied to bring about an autonomous emergency braking operation and, additionally or alternatively, an autonomous evasive maneuver of the vehicle. The collision object can be an external vehicle or a stationary object or obstacle. The environment data can be vehicle-related detected data. The at least one environment sensor can encompass, for example, a camera, a radar device and, additionally or alternatively, a lidar sensor of the vehicle. The intervention data can represent information regarding a planned duration and/or a planned amplitude of an activation of a braking system, a steering system, a transmission and, additionally or alternatively, an engine of the vehicle. The first expected impingement point can represent an impingement point in the absence of the intervention. The second expected impingement point can represent an impingement point with consideration of the intervention. Each evaluation factor can be predefined on the basis of measurements, experiments and, additionally or alternatively, statistical methods. Each evaluation factor can represent an expected injury severity for occupants in the context of a location of an impingement point in the pertinent subregion. A subregion can encompass a sub-portion of the vehicle and, additionally or alternatively, a region, adjacent to a sub-portion of the vehicle, of an environment of the vehicle. The at least one control parameter can represent a duration and/or an amplitude of an activation of a braking system, a steering system, a transmission and, additionally or alternatively, an engine of the vehicle.

In accordance with an example embodiment of the present invention, a reaction of the host vehicle to an initially not yet known reaction of the collision vehicle can thus be adapted in order to displace the collision point to a favorable position. In other words, changes in the driving state of the collision vehicle can be recognized and can be checked as to whether they unfavorably displace the collision point; and a reaction can occur by way of an adaptation of the reaction of the host vehicle in order to displace the collision point back to a more favorable position.

In accordance with an example embodiment, reference data that define, for at least one subregion in the region of a passenger compartment of the vehicle, a first evaluation factor that represents an effect having a first damage potential, and define, for at least one subregion outside a region of the passenger compartment, a second evaluation factor that represents an effect having a second damage potential, can be used in the executing step. The first damage potential can be greater than the second damage potential. A damage potential can be occupant-related and, additionally or alternatively, vehicle-structure-related. An embodiment of this kind offers the advantage that a decision regarding activation or deactivation of the intervention of the safety device can be made in simple, reliable, and exact fashion.

Reference data whose evaluation factors depend on a collision-related damage potential with regard to a sub-portion of the vehicle in at least one of the subregions can also be used in the executing step. The damage potential can be defined, in particular, by a deformation. The deformation can be defined as a vehicle deformation index (VDI, in particular VDI3). An embodiment of this kind offers the advantage of making possible a reliable statement as to which impingement point location is to be assumed to be less harmful for occupants.

In the generating step, the control signal can furthermore be generated with at least one control parameter that brings about an enabling or a suppression of the intervention of the safety device. For example, an enabling of the intervention can be brought about if the location of the second expected impingement point is in a subregion whose evaluation factor is more favorable for safety than a further evaluation factor of a further subregion having the location of the first expected impingement point. For example, a suppression of the intervention can be brought about if the location of the first expected impingement point is in a subregion whose evaluation factor is more favorable for safety than a further evaluation factor of a further subregion having the location of the second expected impingement point. An advantageous displacement of the impingement point into a subregion that is less objectionable for safety can thereby be made possible by enabling or suppressing the intervention.

Additionally or alternatively, in the generating step the control signal can be generated with at least one control parameter that brings about a modification of the intervention of the safety device. A modified intervention of the safety device can be brought about in this context. The control signal can be generated using a result of an evaluation in which a location of a third expected impingement point that results in the context of the modified intervention is evaluated. An embodiment of this kind offers the advantage that the location of an expected impingement point can be optimized even when the first expected impingement point and the second expected impingement point happen to be unfavorably located.

In addition, in the generating step the control signal can be generated with at least one control parameter that brings about control of a duration and, additionally or alternatively, of an amplitude of the intervention. An embodiment of this kind offers the advantage that the safety device can be controlled in simple, reliable, and accurate fashion.

The approach presented here in accordance with the present invention furthermore provides an apparatus that is embodied to carry out, control, or implement, in corresponding devices, the steps of a variant of a method presented here. The object on which the present invention is based can also be quickly and efficiently achieved by this variant embodiment of the present invention in the form of an apparatus.

For this, the apparatus can have at least one computation unit for processing signals or data, at least one storage unit for storing signals or data, at least one interface to a sensor or an actuator for reading in sensor signals from the sensor or for outputting data signals or control signals to the actuator, and/or at least one communication interface for reading in or outputting data that are embedded in a communication protocol. The computation unit can be, for example, a signal processor, a microcontroller, or the like; the memory unit can be a flash memory, an EEPROM, or a magnetic storage unit. The communication interface can be embodied to read in or output data wirelessly and/or in wire-based fashion; a communication interface that can read in or output wire-based data can, for example, electrically or optically read in those data from a corresponding data transfer line or output them into a corresponding data transfer line.

An "apparatus" can be understood in the present case as an electrical device that processes sensor signals and, depending thereon, outputs control signals and/or data signals. The apparatus can have an interface that can be embodied in hardware- and/or software-based fashion. With a hardware-based embodiment the interfaces can be, for example, part of a so-called "system ASIC" that contains a wide variety of functions of the apparatus. It is also possible, however, for the interfaces to be independent integrated circuits or to be made up at least in part of discrete components. With a software-based embodiment, the interfaces can be software modules that are present, for example, on a microcontroller alongside other software modules.

In an advantageous embodiment of the present invention, the apparatus controls a safety device of the vehicle for occupant protection. The apparatus can access for that purpose, for example, sensor signals or sensor data such as environment data, trip data, and intervention data. Control is applied using the control signal by way of the safety device via actuators that are associated with a braking system, a steering system, a transmission and, additionally or alternatively, an engine of the vehicle.

A safety system for a vehicle is also provided in accordance with the present invention. An example embodiment of the safety system includes the following features:
an embodiment of the apparatus recited above; and
the safety device, the safety device and the apparatus being signal-transferringly connected to one another.

In the context of the safety system, an embodiment of the apparatus described above can advantageously be used or utilized to control the safety device, in particular in the context of a recognized imminent collision. The vehicle in which the safety system is installed can also be referred to as a "host vehicle." An external vehicle constituting a collision object can also be referred to as a "target vehicle."

Also advantageous is a computer program product or computer program having program code that can be stored on a machine-readable medium or storage medium such as a semiconductor memory, a hard-drive memory, or an optical memory, and can be used to carry out, implement, and/or control the steps of the method in accordance with one of the embodiments described above, in particular when the program product or program is executed on a computer or an apparatus.

Exemplifying embodiments of the present invention are explained in further detail in the description below and are depicted in the figures.

DETAILED DESCRIPTION OF EXAMPLE EMBODIMENTS

Figure 1:
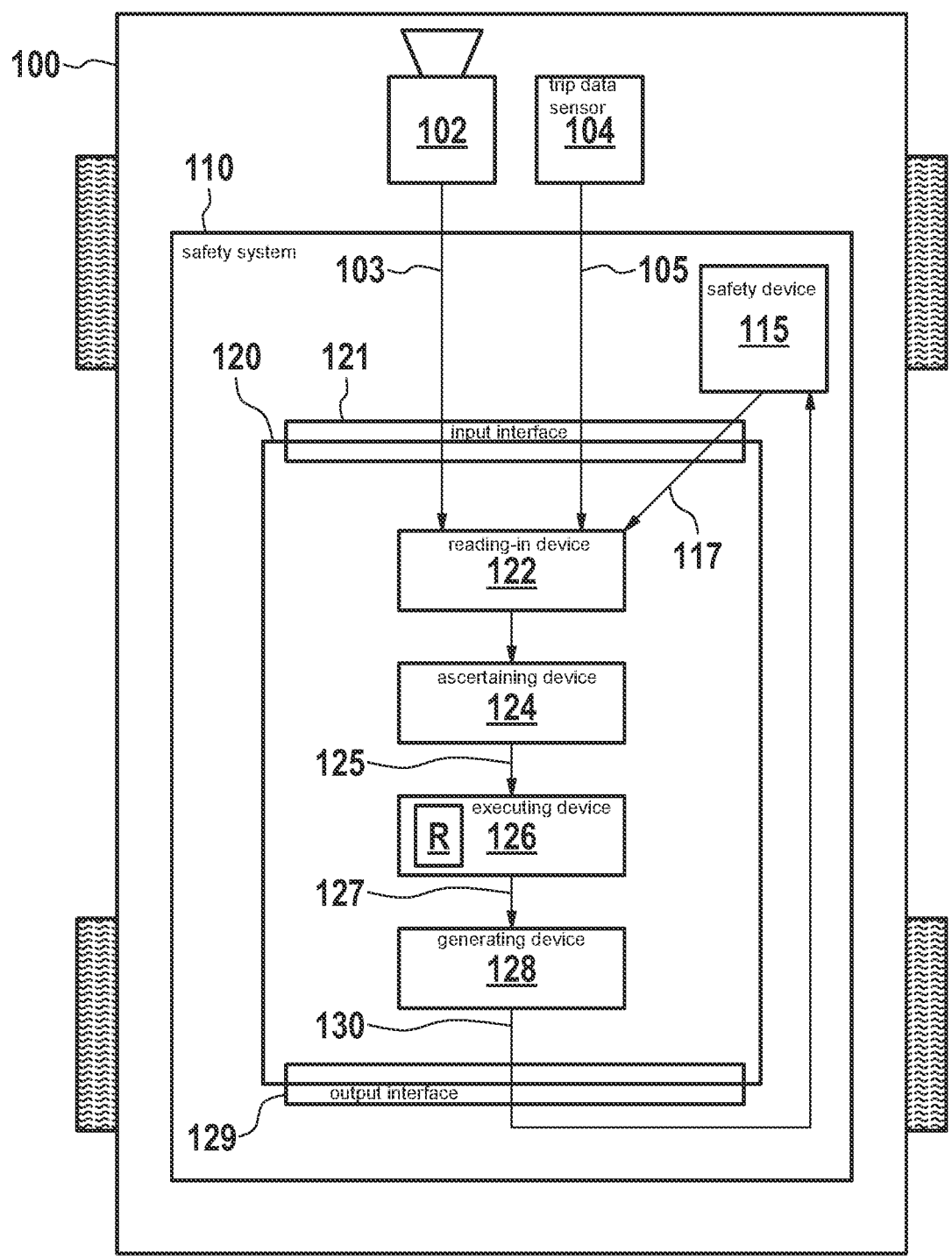
FIG. 1 schematically depicts a vehicle having a safety system, in accordance with an exemplifying embodiment of the present invention.

Before exemplifying embodiments of the present invention are described below in more detail, the background and principles of exemplifying embodiments will first be briefly discussed.

In active safety systems such as the safety system presented here, information from environment sensors, for instance radar or video, and an inherent motion, can be used to draw conclusions as to the criticality of a traffic situation. Because of viewing angle limitations of available systems for active safety, which are often equipped with front sensors having a limited viewing angle, the focus is, for example, on accidents involving traffic moving in longitudinally or slowly from the side. In such accidents, an opposing traffic participant collides primarily with a front region of the host vehicle, regardless of whether the system does or does not activate. Systems that use additional sensors, or sensors having no relevant limitations on the viewing angle, for instance corner radar sensors, can also react to traffic moving in rapidly from the side. Such application instances in the context of cross traffic are characterized in that collisions happen more frequently in the side region of the host vehicle.

A front cross traffic assist (FCTA) function can encompass, for example, the following reaction pattern:

Visual information that informs a driver of approaching cross traffic if the host vehicle is, for example, stationary at an intersection with poor visibility because of a viewing impediment.

Preventing initial movement of the host vehicle, if a collision is imminent as a result of initial movement and driving into the travel path of the cross traffic.

Activation of suspension stiffening, increased brake-system pressure to move the brake pads against the brake disc, so-called "prefill."

Optionally: braking assistance triggered by the driver which generates additional brake pressure if necessary as emergency braking assistance.

Autonomous emergency braking, partial or complete, in the case of a predicted imminent collision with cross traffic.

Optionally: activation of passive safety systems, for instance airbags, if a collision was unavoidable; activation of autonomous emergency steering (AES) to optimize a collision orientation.

In the description below of useful exemplifying embodiments of the present invention, identical or similar reference characters are used for elements that are depicted in the various Figures and function similarly, repeated description of those elements being omitted.

FIG. 1 schematically depicts a vehicle 100 having a safety system 110, in accordance with an exemplifying embodiment. Vehicle 100 is a motor vehicle, for example a passenger car. All that is shown of vehicle 100 in the depiction of FIG. 1 by way of example is an environment sensor 102, a trip data sensor 104, and safety system 110. Safety system 110 is embodied to execute or bring about an autonomous emergency braking operation and/or an autonomous evasive maneuver of vehicle 100 in the event of an imminent collision of vehicle 100 with a collision object.

Environment sensor 102 is embodied to detect an environment of vehicle 100. More precisely, environment sensor 102 is embodied to detect a position, a velocity, and/or an acceleration of the collision object in the environment of vehicle 100. Environment sensor 102 is further embodied to furnish environment data 103 that represent the detected position, velocity, and/or acceleration of the collision object.

Trip data sensor 104 is embodied to detect trip data 105 of vehicle 100. More precisely, trip data sensor 104 is embodied to detect, as trip data 105, a position, a velocity, and/or an acceleration of vehicle 100. Trip data sensor 104 is furthermore embodied to furnish trip data 105.

Safety system 110 encompasses a safety device 115 and an apparatus 120 for controlling safety device 115. Safety device 115 and apparatus 120 are signal-transferringly connected to one another. Safety system 110, more precisely apparatus 120, is signal-transferringly connected to environment sensor 102 and to trip data sensor 104. Safety device 115 is embodied to react, by way of an intervention in a longitudinal and/or transverse guidance of vehicle 100, to an imminent collision of vehicle 100 with a collision object. Safety device 115 is also embodied to furnish intervention data 117 regarding an intervention of safety device 115. Apparatus 120 can also be referred to as a "control apparatus" or "control device."

Apparatus 120 encompasses an input interface 121, a reading-in device 122, an ascertaining device 124, an executing device 126, a generating device 128, and an output interface 129. Reading-in device 122 is embodied to read in environment data 103, trip data 105, and intervention data 117 from input interface 121. Apparatus 120 is signal-transferringly connected via input interface 121 to environment sensor 102, to trip data sensor 104, and to safety device 115. Reading-in device 122 is also embodied to forward the read-in data to ascertaining device 124.

Ascertaining device 124 is embodied to ascertain, using environment data 103 and trip data 105, a first expected impingement point of the collision object on vehicle 100. Ascertaining device 124 is further embodied to ascertain, using environment data 103, trip data 105, and intervention data 117, a second expected impingement point of the collision object on vehicle 100. Ascertaining device 124 is also embodied to forward ascertained data 125, which represent the ascertained first expected impingement point and the ascertained second expected impingement point, to executing device 126.

Executing device 126 is embodied to receive ascertained data 125 from ascertaining device 124. Executing device 126 is embodied to execute, using reference data R, an evaluation of a location of the first expected impingement point and of a location of the second expected impingement point relative to subregions referred to vehicle 100. Reference data R define, for each subregion, an evaluation factor that depends on an effect of the location of an expected impingement point in the subregion on a safety status of at least one occupant of vehicle 100. Executing device 126 is also embodied to forward result data 127, which represent a result of the evaluation, to generating device 128.

Generating device 128 is embodied to generate, depending on the result of the evaluation, a control signal 130 for output to output interface 129 to safety device 115. Control signal 130 encompasses at least one control parameter for controlling safety device 115. Apparatus 120 is embodied to output control signal 130 to output interface 129 to safety device 115.

Reading-in device 122, ascertaining device 124, executing device 126, and generating device 128 are embodied to perform their respective processing or their respective processes, at least once cyclically repeatedly or continuously cyclically repeatedly, before a point in time at which the imminent collision occurs. In the case of repeated performance, the evaluation is executed depending on a detected change in the position, the velocity, and/or the acceleration of the collision object.

In other words, safety system 110 repeatedly or continuously observes the manner in which the driving state of the collision vehicle is changing, for instance whether it is braking. Safety system 110 calculates the influence of the modified driving state of the collision vehicle on the impingement point or collision point. If the collision point shifts unfavorably, safety system 110 adapts the action of host vehicle 100 in such a way that the collision point becomes displaced back to a more favorable point.

In accordance with an exemplifying embodiment, executing device 126 is embodied to use reference data R, which define for at least one subregion in the region of a passenger compartment of vehicle 100 a first evaluation factor that represents an effect having a first damage potential, and define for at least one subregion outside a region of the passenger compartment a second evaluation factor that represents an effect having a second damage potential. The first damage potential is greater than the second damage potential. In particular, executing device 126 is embodied to use reference data R whose evaluation factors depend on a collision-related damage potential, in particular a collision-related deformation of a sub-portion of vehicle 100 in at least one of the subregions.

In accordance with an exemplifying embodiment, generating device 128 is embodied to generate control signal 130 with at least one control parameter that brings about an enabling or a suppression of the intervention of safety device 115. Additionally or alternatively, generating device 128 is embodied to generate control signal 130 with at least one control parameter that brings about a modification of the intervention of safety device 115. In particular, generating device 128 is embodied to generate control signal 130 with at least one control parameter that brings about control of a duration and/or an amplitude of the intervention.

Figure 2:
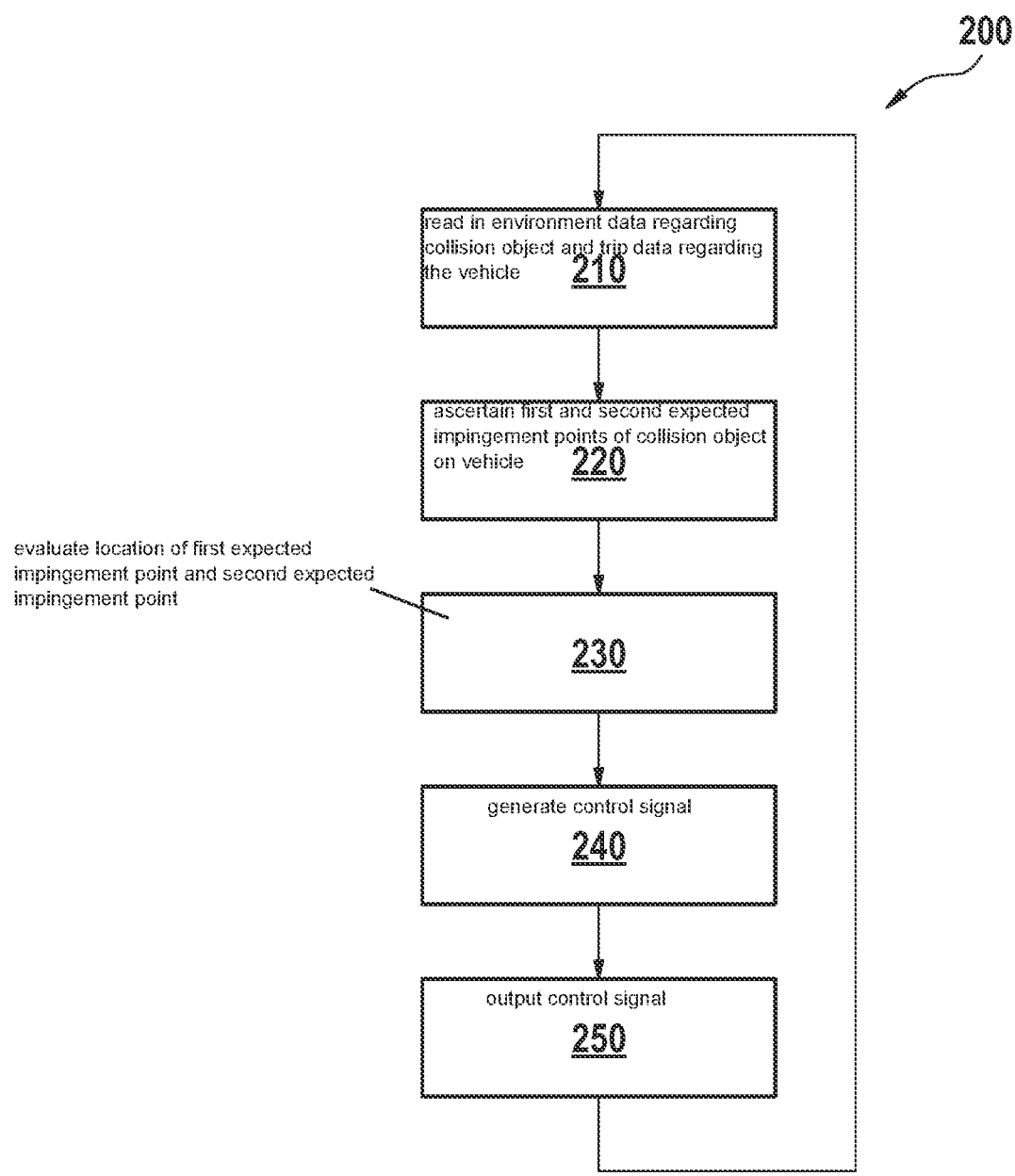
FIG. 2 is a flow chart for a control method, in accordance with an exemplifying embodiment of the present invention.

FIG. 2 is a flow chart of a control method 200, in accordance with an exemplifying embodiment. Control method 200 is executable in order to control a safety device of a vehicle. Control method 200 is executable in order to control the safety device of FIG. 1 or a similar safety device. Control method 200 is also executable using the apparatus of FIG. 1 or a similar apparatus. Control method 200 encompasses a reading-in step 210, an ascertaining step 220, an executing step 230, and a generating step 240. An outputting step 250 is additionally shown.

In reading-in step 210, environment data regarding a position, a velocity, and/or an acceleration of the collision object in an environment of the vehicle are read in from an interface to at least one environment sensor of the vehicle. In addition, in reading-in step 210 trip data regarding a position, a velocity, and/or an acceleration of the vehicle are read in from an interface to at least one trip data sensor of the vehicle. In reading-in step 210, intervention data regarding an intervention of the safety device are also read in from an interface to the safety device.

In ascertaining step 220, a first expected impingement point of the collision object on the vehicle is then ascertained using the environment data and the trip data. A second expected impingement point of the collision object on the vehicle is also ascertained in ascertaining step 220 using the environment data, the trip data, and the intervention data. An evaluation of a location of the first expected impingement point and of a location of the second expected impingement point, relative to subregions referred to the vehicle, is then in turn executed in executing step 230. The reference data define, for each subregion, an evaluation factor that depends on an effect of the location of an expected impingement point in the subregion on a safety status of at least one occupant of the vehicle. In generating step 240, a control signal for output to an interface to the safety device is then generated depending on a result of the evaluation executed in executing step 230. The control signal encompasses at least one control parameter for controlling the safety device.

In control method 200, before a point in time of occurrence of the imminent collision, reading-in step 210, ascertaining step 220, executing step 230, and generating step 240 are performed at least once cyclically repeatedly or continuously cyclically repeatedly. After a first cyclic pass through the steps in the sequence recited above, at least one further cyclic pass through the steps thus occurs before or until the collision occurs. In the case of repeated performance, in executing step 230 the evaluation is executed depending on a detected change in the position, the velocity, and/or the acceleration of the collision object.

In accordance with an exemplifying embodiment, control method 200 also encompasses outputting step 250. In outputting step 250, the control signal generated in generating step 240 is outputted to the interface to the safety device.

FIG. 3, FIG. 4, FIG. 5, FIG. 6, and FIG. 7 each schematically depict a respective impingement point 301, 401, 502, 601, and 702 of a collision object 300 on a vehicle 100, in accordance with an exemplifying embodiment, in the context of a collision or imminent collision. Vehicle 100 corresponds to or resembles the vehicle of FIG. 1.

Figure 3:
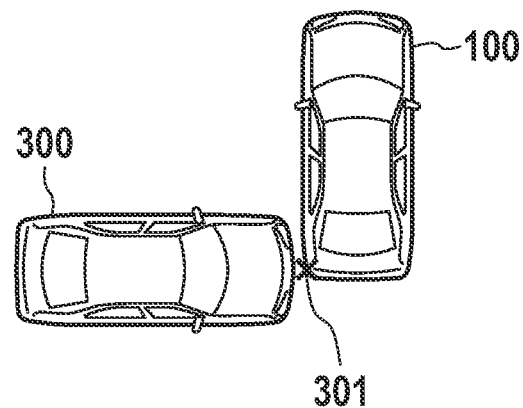
FIG. 3 schematically depicts an impingement point of a collision object on a vehicle, in accordance with an exemplifying embodiment of the present invention.

FIG. 3 schematically depicts an actual impingement point 301 of a collision object 300 on a vehicle 100, in accordance with an exemplifying embodiment. If the safety system of FIG. 1 does not trigger a system reaction or an intervention, the impingement point or actual impingement point can be located at the rear side portion of host vehicle 100 (trunk), and in the context of an intervention or a system reaction involving braking, the impingement point can be located at the passenger compartment. An impingement point at the passenger compartment poses a greater risk of injury to occupants than actual impingement point 301 on the trunk. The safety system thus decides against triggering the automatic braking operation. The situation could change again, however, in the time interval between the decision to suppress braking and the collision, for example due to actions by the driver of the target vehicle or collision object 300 which were not known at the first decision time. If the driver of the target vehicle were to accelerate, for example, then without automatic braking of host vehicle 100 the impingement point could shift toward the passenger compartment, so that an automatic braking operation of host vehicle 100 could result in a favorable displacement of the impingement point toward the front of host vehicle 100. A continuous updating of the decisions based on situational changes in order to achieve an impingement point that results in a minimal collision severity is therefore advantageous, as will be explained below.

FIG. 4, FIG. 5, FIG. 6, and FIG. 7 show a simple example of the behavior of the safety system of vehicle 100. The safety system iteratively or cyclically repeatedly adapts the trajectory or the longitudinal and/or transverse guidance of vehicle 100 to situational changes in order to arrive at an impingement point that decreases the collision severity.

Figure 4:
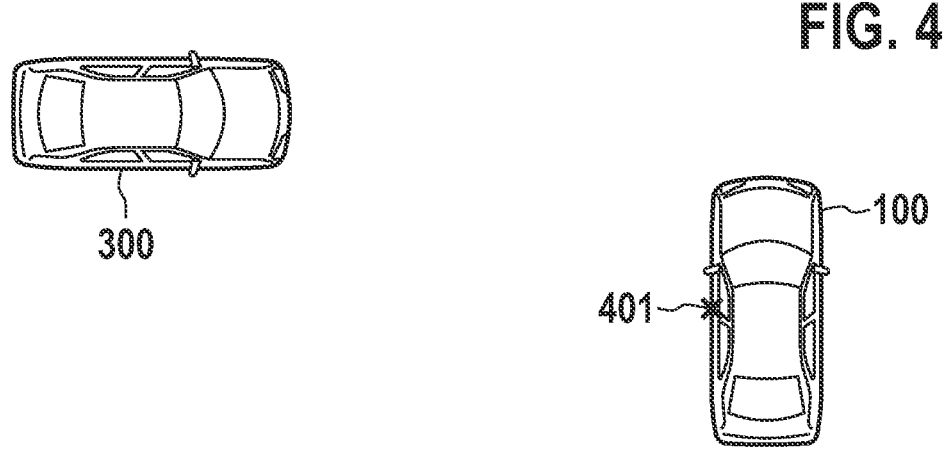
FIG. 4 schematically depicts an impingement point of a collision object on a vehicle, in accordance with an exemplifying embodiment of the present invention.

FIG. 4 schematically depicts a first expected impingement point 401 of collision object 300 on a vehicle 100, in accordance with an exemplifying embodiment. First expected impingement point 401 is located in the region of the passenger compartment of vehicle 100. An autonomous emergency braking operation of vehicle 100, for example, would be triggered by the safety system of vehicle 100 as an intervention.

Figure 5:
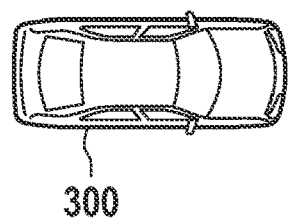
FIG. 5 schematically depicts an impingement point of a collision object on a vehicle, in accordance with an exemplifying embodiment of the present invention.
Figure 5:
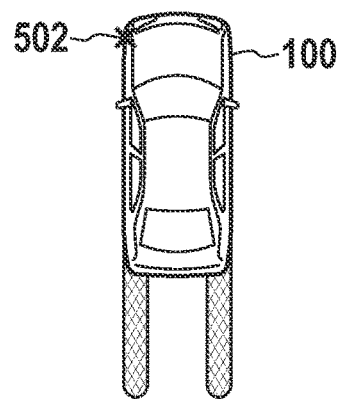

FIG. 5 schematically depicts a second expected impingement point 502 of collision object 300 on a vehicle 100, in accordance with an exemplifying embodiment. Second expected impingement point 502 is displaced toward a front region of vehicle 100 by the planned intervention or autonomous emergency braking operation mentioned above with reference to FIG. 4.

Figure 6:
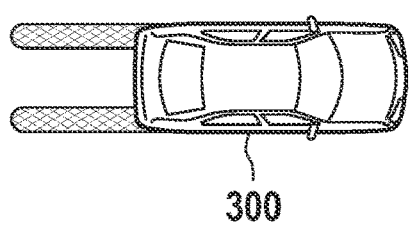
FIG. 6 schematically depicts an impingement point of a collision object on a vehicle, in accordance with an exemplifying embodiment of the present invention.
Figure 6:
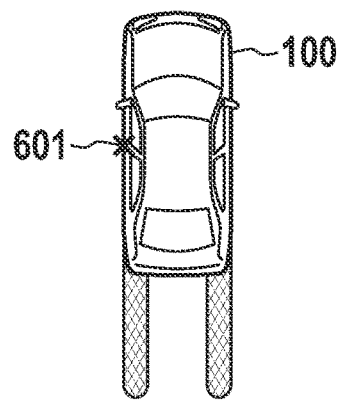

FIG. 6 schematically depicts a further expected impingement point 601 of collision object 300 on a vehicle 100, in accordance with an exemplifying embodiment. Further expected impingement point 601 is treated by the safety system of vehicle 100, for example, like the first expected impingement point. Because collision object 300 or the target vehicle is also beginning to brake, which is recognized by the safety system of vehicle 100 in the context of a repeated processing pass, further expected impingement point 601 is displaced again proceeding from the situation in FIG. 5, in this case back into the region of the passenger compartment of vehicle 100.

Figure 7:
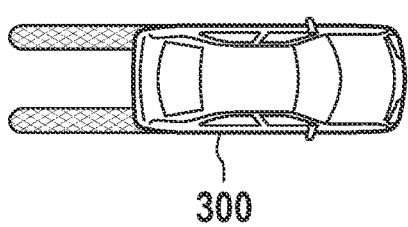
FIG. 7 schematically depicts an impingement point of a collision object on a vehicle, in accordance with an exemplifying embodiment of the present invention.
Figure 7:
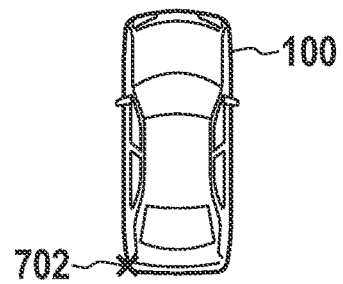

FIG. 7 schematically depicts an additional expected impingement point 702 of collision object 300 on a vehicle 100, in accordance with an exemplifying embodiment. Additional expected impingement point 702 is treated by the safety system of vehicle 100, for example, like the second expected impingement point. Additional expected impingement point 702 is displaced by a new planned intervention of the safety system of vehicle 100 to a region of a trunk of vehicle 100, the new planned intervention involving a suppression of or decrease in the autonomous emergency braking operation.

Referring to the Figures described above, let it be noted below merely in summary fashion that safety system 110 is disposed in vehicle 100. By way of sensors of vehicle 100, more precisely by way of environment sensor 102 (for instance, radar sensors, camera, etc.) and trip data sensor 104, safety system 110 monitors the surroundings and predicts whether a collision will occur between a collision object 300 and host vehicle 100. In situations in which a collision is unavoidable, safety system 100 [sic: 110] improves the impingement point by intervening in the longitudinal and/or transverse guidance of host vehicle 100, for instance by braking, accelerating, and/or steering. The collision opponent or collision object 300 can, however, also react to the collision and, for example, also brake. This could displace the impingement point back into a disadvantageous location. Safety system 110 recognizes the change in the state of collision object 300 and calculates how this action influences the impingement point. If the impingement point will be disadvantageously influenced, safety system 110 reacts accordingly in order to displace the impingement point once again into a more advantageous location, for instance by braking, accelerating, or steering host vehicle 100. The monitoring of the behavior of collision object 300, the determination of the effects on the impingement points, and the corresponding reactions can be performed once, several times, or continuously in the time interval up to the collision.

If an exemplifying embodiment encompasses an "and/or" relationship between a first feature and a second feature, this is to be read to mean that the exemplifying embodiment according to one embodiment has both the first feature and the second feature, and according to a further embodiment has either only the first feature or only the second feature.

What is claimed is:

1. A method for controlling a safety device of a vehicle, the safety device being configured to react to an imminent collision of the vehicle with a collision object by way of an intervention in a longitudinal and/or lateral guidance of the vehicle, the method comprising the following steps:
    reading in: (i) from an interface to at least one environment sensor of the vehicle, environment data regarding a position of the collision object, and/or a velocity of the collision object, and/or an acceleration of the collision object, in an environment of the vehicle, (ii) from an interface to at least one trip data sensor of the vehicle, trip data regarding a position of the vehicle, and/or a velocity of the vehicle, and/or an acceleration of the vehicle, and (iii) from an interface to the safety device, intervention data regarding the intervention of the safety device;
    ascertaining; (i) a first expected impingement point of the collision object on the vehicle using the environment data and the trip data, and (ii) a second expected impingement point of the collision object on the vehicle using the environment data, the trip data, and the intervention data;
    executing an evaluation of a location of the first expected impingement point and of a location of the second expected impingement point relative to subregions referred to the vehicle, using reference data that define, for each subregion of the subregions, an evaluation factor that depends on an effect of a location of an expected impingement point in the subregion on a safety status of at least one occupant of the vehicle; and
    generating, depending on a result of the evaluation, a control signal for output to an interface to the safety device, the control signal having at least one control parameter for controlling the safety device;
    wherein the reading-in step, the ascertaining step, the executing step, and the generating step are performed, before a point in time at which the imminent collision occurs, at least once or continuously cyclically repeatedly, such that in the repeated performance, in the executing step, the evaluation is executed depending on a detected change in the position of the collision object, and/or a detected change in the velocity of the collision object, and/or a detected change in the acceleration of the collision object.

2. The method as recited in claim 1, wherein the reference data include first reference data that define, for at least one subregion in a region of a passenger compartment of the vehicle, a first evaluation factor that represents an effect having a first damage potential, and define, for at least one subregion outside a region of the passenger compartment, a second evaluation factor that represents an effect having a second damage potential, the first reference data being used in the executing step, the first damage potential being greater than the second damage potential.

3. The method as recited in claim 1, wherein the reference data include first reference data whose evaluation factors depend on a collision-related damage potential with regard to a sub-portion of the vehicle in at least one of the subregions, the first reference data being used in the executing step.

4. The method as recited in claim 1, wherein in the generating step, the control signal is generated with at least one control parameter that brings about an enabling or a suppression of the intervention of the safety device.

5. The method as recited in claim 1, wherein in the generating step, the control signal is generated with at least one control parameter that brings about a modification of the intervention of the safety device.

6. The method as recited in claim 1, wherein in the generating step, the control signal is generated with at least one control parameter that brings about control of a duration and/or of an amplitude of the intervention of the safety device.

7. An apparatus configured to control a safety device of a vehicle, the safety device being configured to react to an imminent collision of the vehicle with a collision object by way of an intervention in a longitudinal and/or lateral guidance of the vehicle, the apparatus configured to:
    read in: (i) from an interface to at least one environment sensor of the vehicle, environment data regarding a position of the collision object, and/or a velocity of the collision object, and/or an acceleration of the collision object, in an environment of the vehicle, (ii) from an interface to at least one trip data sensor of the vehicle, trip data regarding a position of the vehicle, and/or a velocity of the vehicle, and/or an acceleration of the vehicle, and (iii) from an interface to the safety device, intervention data regarding the intervention of the safety device;
    ascertain: (i) a first expected impingement point of the collision object on the vehicle using the environment data and the trip data, and (ii) a second expected impingement point of the collision object on the vehicle using the environment data, the trip data, and the intervention data;
    execute an evaluation of a location of the first expected impingement point and of a location of the second expected impingement point relative to subregions referred to the vehicle, using reference data that define, for each subregion of the subregions, an evaluation factor that depends on an effect of a location of an expected impingement point in the subregion on a safety status of at least one occupant of the vehicle; and
    generate, depending on a result of the evaluation, a control signal for output to an interface to the safety device, the control signal having at least one control parameter for controlling the safety device;
    wherein the apparatus is configured to perform the reading-in, the ascertaining, the executing, and the generating, before a point in time at which the imminent collision occurs, at least once or continuously cyclically repeatedly, such that in the repeated performance, in the executing, the evaluation is executed depending on a detected change in the position of the collision object, and/or a detected change in the velocity of the collision object, and/or a detected change in the acceleration of the collision object.

8. A safety system for a vehicle, the safety system comprising:
an apparatus configured to control a safety device of a vehicle, the safety device being configured to react to an imminent collision of the vehicle with a collision object by way of an intervention in a longitudinal and/or lateral guidance of the vehicle, the apparatus configured to:
read in: (i) from an interface to at least one environment sensor of the vehicle, environment data regarding a position of the collision object, and/or a velocity of the collision object, and/or an acceleration of the collision object, in an environment of the vehicle, (ii) from an interface to at least one trip data sensor of the vehicle, trip data regarding a position of the vehicle, and/or a velocity of the vehicle, and/or an acceleration of the vehicle, and (iii) from an interface to the safety device, intervention data regarding the intervention of the safety device,
ascertain: (i) a first expected impingement point of the collision object on the vehicle using the environment data and the trip data, and (ii) a second expected impingement point of the collision object on the vehicle using the environment data, the trip data, and the intervention data,
execute an evaluation of a location of the first expected impingement point and of a location of the second expected impingement point relative to subregions referred to the vehicle, using reference data that define, for each subregion of the subregions, an evaluation factor that depends on an effect of a location of an expected impingement point in the subregion on a safety status of at least one occupant of the vehicle, and
generate, depending on a result of the evaluation, a control signal for output to an interface to the safety device, the control signal having at least one control parameter for controlling the safety device;
wherein the apparatus is configured to perform the reading-in, the ascertaining, the executing, and the generating, before a point in time at which the imminent collision occurs, at least once or continuously cyclically repeatedly, such that in the repeated performance, in the executing, the evaluation is executed depending on a detected change in the position of the collision object, and/or a detected change in the velocity of the collision object, and/or a detected change in the acceleration of the collision object; and the safety device, the safety device and the apparatus being signal-transferringly connected to one another.

9. A non-transitory machine-readable storage medium on which is stored a computer program for controlling a safety device of a vehicle, the safety device being configured to react to an imminent collision of the vehicle with a collision object by way of an intervention in a longitudinal and/or lateral guidance of the vehicle, the computer program, when executed by a computer, causing the computer to perform the following steps:
reading in: (i) from an interface to at least one environment sensor of the vehicle, environment data regarding a position of the collision object, and/or a velocity of the collision object, and/or an acceleration of the collision object, in an environment of the vehicle, (ii) from an interface to at least one trip data sensor of the vehicle, trip data regarding a position of the vehicle, and/or a velocity of the vehicle, and/or an acceleration of the vehicle, and (iii) from an interface to the safety device, intervention data regarding the intervention of the safety device;
ascertaining: (i) a first expected impingement point of the collision object on the vehicle using the environment data and the trip data, and (ii) a second expected impingement point of the collision object on the vehicle using the environment data, the trip data, and the intervention data;
executing an evaluation of a location of the first expected impingement point and of a location of the second expected impingement point relative to subregions referred to the vehicle, using reference data that define, for each subregion of the subregions, an evaluation factor that depends on an effect of a location of an expected impingement point in the subregion on a safety status of at least one occupant of the vehicle; and
generating, depending on a result of the evaluation, a control signal for output to an interface to the safety device, the control signal having at least one control parameter for controlling the safety device;
wherein the reading-in step, the ascertaining step, the executing step, and the generating step are performed, before a point in time at which the imminent collision occurs, at least once or continuously cyclically repeatedly, such that in the repeated performance, in the executing step, the evaluation is executed depending on a detected change in the position of the collision object, and/or a detected change in the velocity of the collision object, and/or a detected change in the acceleration of the collision object.

* * * * *